United States Patent [19]
Sefidvash

[11] Patent Number: 5,287,210
[45] Date of Patent: Feb. 15, 1994

[54] SMART INFRARED CONTROLLER

[76] Inventor: Siavash Sefidvash, 2950 Sombrosa St., Carlsbad, Calif. 92009

[21] Appl. No.: 820,752

[22] Filed: Jan. 13, 1992

[51] Int. Cl.$^5$ .............................................. H04B 10/10
[52] U.S. Cl. ................................... 359/147; 359/142; 359/146; 348/734
[58] Field of Search ............... 359/142, 146, 147, 148, 359/189, 147; 358/194.1

[56] References Cited

U.S. PATENT DOCUMENTS

| | | | |
|---|---|---|---|
| 4,703,359 | 10/1987 | Rumbolt | 359/148 |
| 4,771,283 | 10/1988 | Imoto | 359/148 |
| 4,802,114 | 1/1989 | Sogame | 359/148 |
| 4,856,081 | 8/1989 | Smith | 359/148 |
| 4,866,434 | 9/1989 | Keenan | 358/194.1 |
| 5,124,805 | 6/1992 | Chung | 358/248 |
| 5,148,159 | 9/1992 | Clark | 358/194.1 |

FOREIGN PATENT DOCUMENTS

| | | | |
|---|---|---|---|
| 0314177 | 5/1989 | European Pat. Off. | 359/148 |
| 0240798 | 10/1986 | Japan | 359/148 |
| 0072297 | 4/1987 | Japan | 359/148 |
| 0217895 | 9/1988 | Japan | 359/148 |
| 0212094 | 8/1989 | Japan | 359/148 |

*Primary Examiner*—Leslie Pascal
*Attorney, Agent, or Firm*—Loyal Hanson

[57] ABSTRACT

An infrared controller device includes an infrared detector for detecting infrared signals from a remote control infrared transmitter and microprocessor circuitry responsive to the infrared detector for producing an output and switching the output from an OFF state to an ON state if a detected infrared signal has a predetermined waveform. The microprocessor circuitry is configured to operate in a LEARNING MODE in which the microprocessor circuitry produces and stores a set of LEARNED DATA indicative of the waveform of a detected infrared signal. The microprocessor circuitry is also configured to operate in a WORKING MODE in which the microprocessor circuitry (a) produces a set of WORKING DATA for each detected infrared signal that is indicative of the waveform of the detected infrared signal, (b) compares the set of WORKING DATA for each detected infrared signal with the first set of LEARNED data, and (c) switches the output from an OFF state to an ON state if the WORKING DATA matches the LEARNED DATA. The microprocessor circuitry may be configured to learn more than one infrared signal and the controller may be combined with a rotatable TV stand to provide remote clockwise and counterclockwise control of the stand with virtually any infrared remote control transmitter.

1 Claim, 4 Drawing Sheets

SMART INFRARED CONTROLLER

BACKGROUND OF THE INVENTION

1. Technical Field.

This invention relates generally to infrared control systems such as those used to control television sets, cable television selectors, and video cassette recorders, and more particularly to a smart infrared controller that will work with virtually any infrared remote control unit.

2. Background Information.

Recall that an infrared remote control unit such as a conventional television channel changer, often takes the form of a handheld infrared transmitter outfitted with an array of pushbuttons. An operator desiring to change channels pushes one or more of the buttons. That causes the remote control transmitter to emit an infrared signal encoded with control information. An infrared controller at the television set responds to the infrared signal by making the desired channel change.

Now consider the task of designing a motorized television stand that an operator can rotate by remote control. Preferably, the rotatable stand includes a controller that responds to the remote control transmitter the operator uses to change television channels. That way, the operator can rotate the stand and change channels using the same transmitter. But the various remote control transmitters commercially available are not always compatible because they do not all encode the infrared signals the same way. So, a controller designed to recognize signals sent with one remote control transmitter might not work with another. That problem is compounded by the ability of manufacturers to change the design of their transmitters each year for competitive or other reasons. Therefore, it is desirable to have a controller that can better accommodate differences in remote control transmitters.

SUMMARY OF THE INVENTION

This invention solves the problem outlined above by providing a smart infrared controller that learns to recognize the signals produced by the transmitter in use. First, the operator puts the controller in a learning mode. Next, the operator presses a pushbutton on the remote control transmitter so that the remote control unit emits an infrared signal. The controller then receives the infrared signal and stores data indicative of its waveform. In other words, the controller learns the waveform.

Thereafter, the controller returns to a working mode. In the working mode, it produces data indicative of the waveform of each incoming infrared signal and compares that data with the stored data. When the waveform of the incoming signal matches the learned waveform, the controller produces a switched output that can be used to perform any of various desired control functions.

Thus, the controller of this invention will work with virtually any infrared remote control transmitter. The operator need only conduct a short training session to teach the controller the waveforms associated with one or more pushbuttons. Furthermore, the controller can be retaught to respond to different transmitters.

Generally, an infrared controller constructed according to the invention includes an infrared detector and microprocessor circuitry responsive to the infrared detector. The infrared detector performs the function of detecting an infrared signal, such as the signal emitted by a conventional television remote control transmitter. Meanwhile, the microprocessor circuitry performs the function of producing an output and switching it from an OFF state to an ON state if the infrared signal has a predetermined waveform. The output of the microprocessor circuitry may be used to control any of various switchable devices, such as the drive motor on a rotatable TV stand, and it may take any of various forms having an ON state and an OFF state (such as first and second voltage levels). The microprocessor circuitry may include any of various known components controlled by the output to produce a switch closure, such as a relay or a semiconductor switch.

According to a major aspect of the invention, the microprocessor circuitry is configured with suitable programming to operate in a first mode for learning purposes (a LEARNING MODE) and a second mode for normal operation (a WORKING MODE). While in the LEARNING MODE, the microprocessor circuitry produces a set of data (LEARNED DATA) indicative of the waveform of a detected infrared signal that the operator is teaching the controller to recognize. The set of LEARNED DATA is stored for subsequent comparison with data indicative of signals detected in the WORKING MODE.

Preferably, the microprocessor circuitry includes at least one pushbutton switch or other suitable input device for enabling an operator to manually switch from the WORKING MODE to the LEARNING MODE. In addition, the microprocessor circuitry is preferably configured to momentarily switch to the LEARNING MODE when that device is actuated and then automatically switch back to the WORKING MODE. The microprocessor circuitry is so configured that when an infrared signal is detected in the WORKING MODE, the microprocessor circuitry (a) produces a set of data for each detected infrared signal (WORKING DATA), (b) compares the WORKING DATA for each detected infrared signal with the LEARNED data, and (c) switches the output from the OFF state to the ON state (preferably momentarily) if the WORKING DATA matches the LEARNED DATA.

The microprocessor circuitry may include two or more input switches and a like number of outputs. Then the microprocessor circuitry is configured to produce and store a separate set of LEARNED DATA for each of the input switches and to switch the appropriate one of the outputs according to which set of LEARNED DATA the WORKING DATA matches. That enables individual control of two or more outputs after teaching the controller the waveform of a like number of different infrared signals from the infrared transmitter. In terms of a rotatable TV stand, one output of the microprocessor circuitry is used to cause the drive motor to turn the stand clockwise and another to cause it to turn the stand counterclockwise. Of course, the outputs of a controller constructed according to the invention may be used to control any of various switchable devices.

The foregoing and other objects, features, and advantages of the invention will become more apparent upon reading the following detailed description with reference to the illustrative drawings.

DESCRIPTION OF THE PREFERRED EMBODIMENTS

Figure 1:
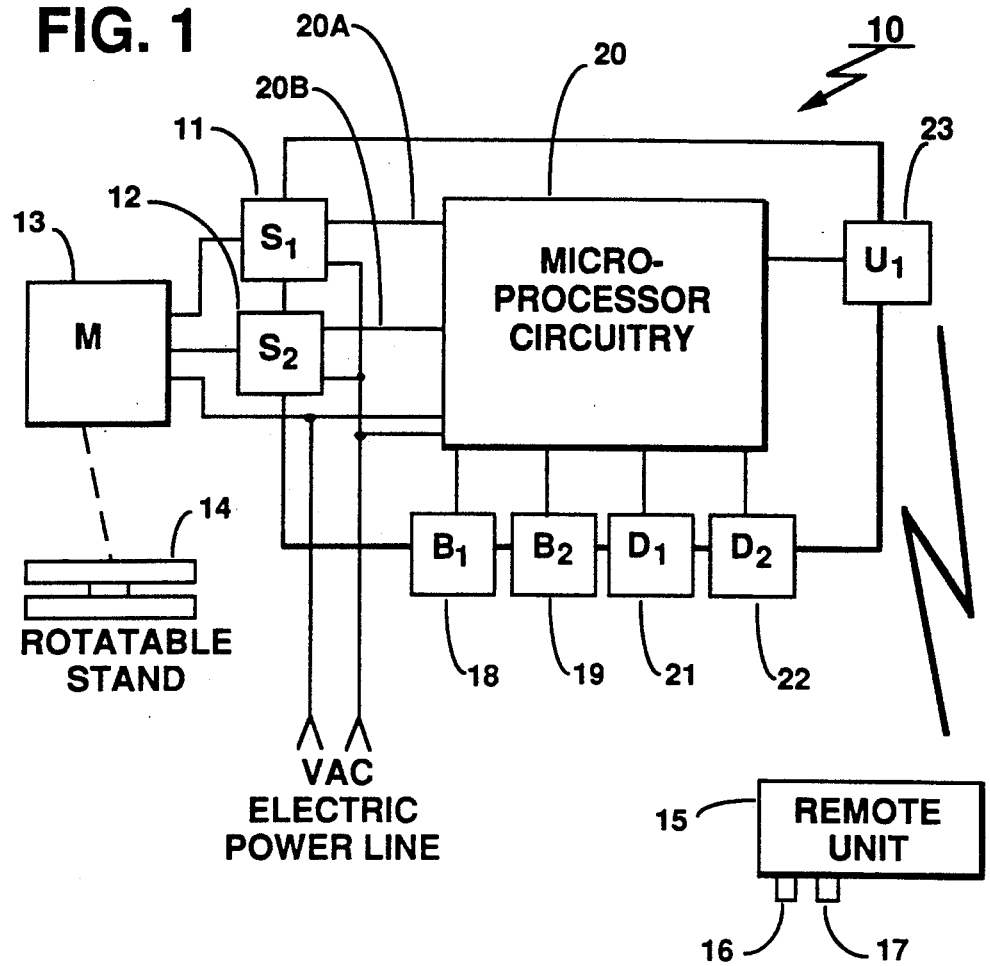
FIG. 1 of the drawings is a block diagram of an infrared controller constructed according to the invention that is used to control the drive motor of a rotatable TV stand using a conventional infrared transmitter.

The drawings show an infrared controller 10 constructed according to the invention. The illustrated controller 10 is shown operationally connected via first and second switches 11 and 12 to a drive motor 13 that is mechanically linked by suitable means to a rotatable stand 14. The controller 10 actuates the first switch 11 to operate the drive motor 13 in a forward direction and that causes the rotatable stand 14 to rotate in a clockwise direction. Similarly, the controller 10 actuates the switch 12 to power the drive motor 13 in a reverse direction and that causes the rotatable stand 14 to rotate in a counterclockwise direction.

With a television set upon the rotatable stand 14 and an infrared transmitter 15 in hand, an operator can remotely control the rotatable stand 14 and thereby move the television set to a desired viewing angle. First, the operator must teach the controller 10 to recognize two infrared signals emitted by the transmitter 15. The first infrared signal will be used to actuate the clockwise switch 11 and the second will be used to actuate the counterclockwise switch 12.

In that regard, the transmitter 15 may take the form of a conventional television infrared remote control unit with an array of pushbutton switches something like a keypad. Only two pushbutton switches 16 and 17 are shown in FIG. 1 for illustrative purposes. Depressing the pushbutton switch 16 causes the transmitter 15 to emit a first infrared signal having a first predetermined waveform (e.g., a first chain of pulses). Depressing the pushbutton switch 17 causes the transmitter 15 to emit a second infrared signal having a second predetermined waveform different than the first (e.g., a second chain of pulses different than the first).

To teach the controller 10 to recognize the first infrared signal and to actuate the clockwise switch 11 in response, the operator depresses or otherwise actuates a first input switch 18 on the controller 10 and then depresses the pushbutton switch 16. The first input switch 18 may be called the clockwise learning switch. Similarly, to teach the controller 10 to recognize the second infrared signal emitted when the pushbutton switch 17 is depressed on the transmitter 15 (and to actuate the clockwise switch 11 in response), the operator actuates a second input switch 19 (the counterclockwise learning switch) and then depresses the pushbutton switch 17.

The first and second input switches 18 and 19 serve the function of enabling an operator to initiate a mode of operation in which microprocessor circuitry 20 learns to recognize incoming signals (a LEARNING MODE). The microprocessor circuitry 20 is part of the controller 10. It performs the function of producing switched outputs (i.e., switched output signals) under program control. It switches the outputs between OFF states and ON states according to the waveform of detected infrared signals. The outputs of the microprocessor circuitry 20 may be used to control any of various switchable devices, such as the drive motor 13 on the rotatable stand 14, and they may take any of various forms having an ON state and an OFF state (such as first and second voltage levels). The microprocessor circuitry 20 illustrated in FIG. 1 has first and second outputs that are coupled by lines 20A and 20B to the switches 11 and 12.

The microprocessor circuitry 20 responds whenever one of the switches 18 and 19 is actuated by switching from a normal operating mode of operation (a WORKING MODE) to the LEARNING MODE. The microprocessor circuitry 20 then determines which of the switches was actuated and turns on a respective one of first and second light emitting diodes 21 and 22. The first diode 21 produces a first operator-discernible signal indicating that the microprocessor circuitry is in the LEARNING MODE in response to actuation of the first input switch 18.

Similarly, the second diode 21 produces a second operator-discernible signal indicating that the microprocessor circuitry is in the LEARNING MODE in response to actuation of the second input switch 19. After actuating one of the input switches 18 and 19, the operator views the diodes 21 and 22 to verify that the microprocessor circuitry 20 is ready to learn. Then, the operator depresses the pushbutton switch 16 (the button selected for clockwise operation) if the diode 21 is on, or the pushbutton switch 17 (the button selected for counterclockwise operation) if the diode 22 is on.

When the operator depresses the first pushbutton switch 16 with the first diode 21 on, the transmitter 15 emits the first infrared signal and an infrared detector 23 that is part of the controller 10 detects that signal. The microprocessor circuitry 20 responds to the detector 23 by producing and storing data indicative of the waveform of the first infrared signal (a first set of LEARNED DATA). The microprocessor circuitry then automatically switches back to the WORKING MODE.

Similarly, when operator depresses pushbutton switch 17 with the second diode 22 is on, the transmitter 15 emits the second infrared signal and the detector 23 detects it. The microprocessor circuitry 20 reponds by producing and storing data indicative of the waveform of the second infrared signal (a second set of LEARNED DATA). Then, the microprocessor circuitry automatically switches back to the WORKING MODE.

Operation proceeds in the WORKING mode with the detector 23 detecting any incoming infrared signals. The microprocessor circuitry 20 responds by first producing a set of WORKING DATA for each detected infrared signal that is indicative of the waveform of the signal. Then the microprocessor circuitry 20 compares each set of WORKING DATA with the LEARNED DATA and switches the outputs accordingly.

If the WORKING DATA matches the first set of LEARNED DATA, the microprocessor circuitry 20 switches the first output from an OFF state to an ON state. That rotates the stand 14 clockwise. If the WORKING DATA matches the second set of LEARNED DATA, the microprocessor circuitry 20 switches the second output from an OFF state to an ON state. That rotates the stand 14 counterclockwise. If the WORKING DATA does not match either the first or second set of LEARNED DATA, the microprocessor circuitry 20 leaves both the first and second outputs in an OFF state and so the stand 14 remains in its present position.

Figure 2:
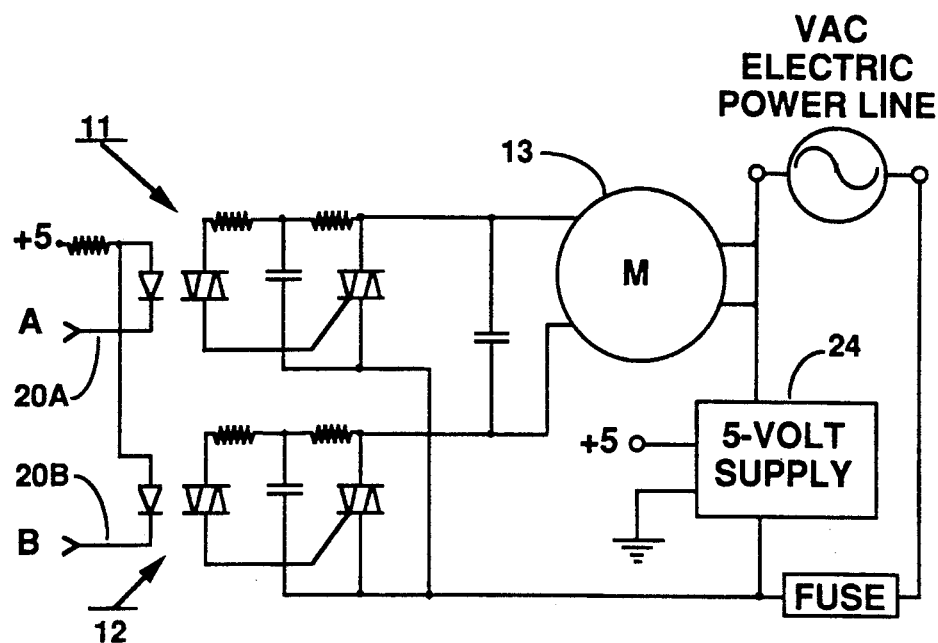
FIGS. 2 and 3 combined are a schematic diagram of the controller and rotatable TV stand.
Figure 3:
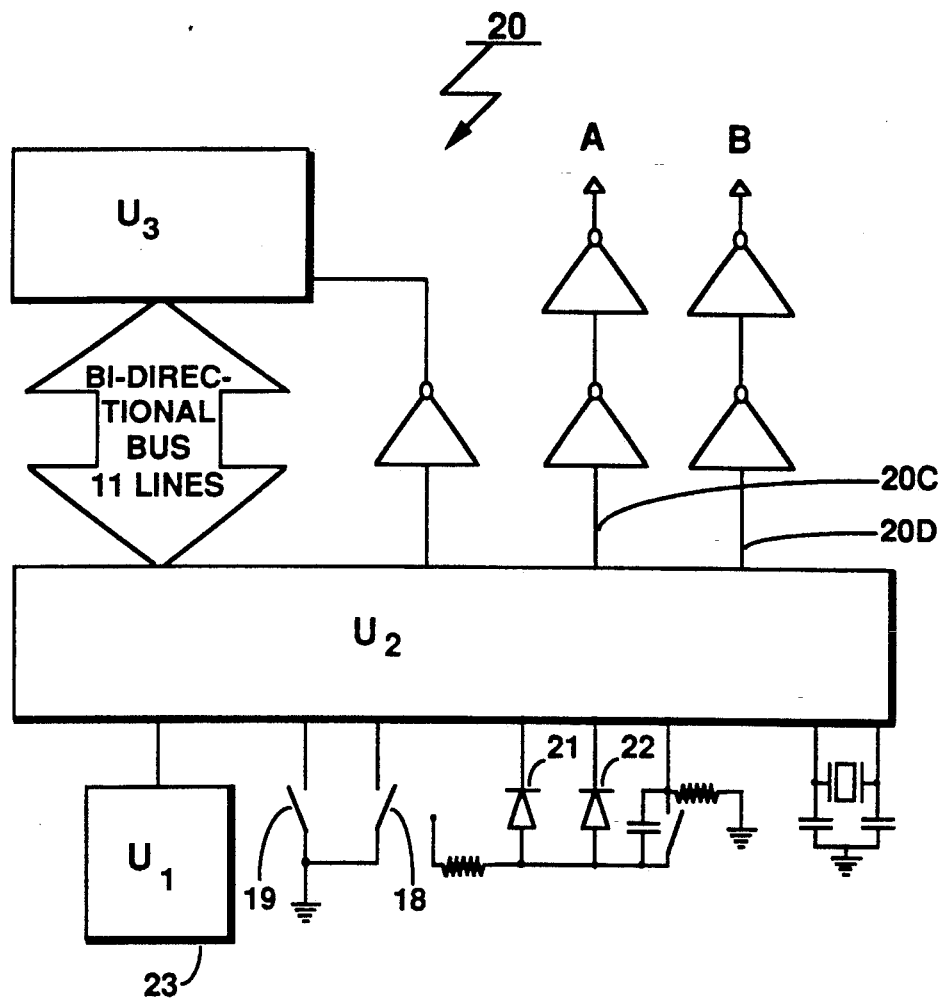

FIGS. 2 and 3 combine at points A and B to form a schematic diagram of circuitry that may be employed.

The switches 11 and 12 (FIG. 2) are controlled by the first and second outputs of the microprocessor circuitry (FIG. 3) and they may use known optically coupled components. The motor 13 may be a reversible alternating current motor designed for 115-volt operation. A 5-volt regulated direct current power supply 24 (FIG. 2) provides power for the infrared detector 23 (U1) and microprocessor circuitry 20 (FIG. 3). Of course, those circuit details may vary within the broader inventive concepts disclosed.

The illustrated microprocessor circuitry 20 includes a commercially available microprocessor chip U2 with an analog-to-digital converter that produces data indicative of the waveform of infrared signals detected by the detector 23. The microprocessor circuitry 20 also includes suitable supporting componentry such as a programmable read only memory chip U3 (FIG. 3). Those components form the microprocessor circuitry 20 and they are configured to accomplish the functions described. They are so configured in the sense that they are interconnected and programmed to accomplish those functions. Known design and programming techniques may be employed for that purpose.

Figure 4:
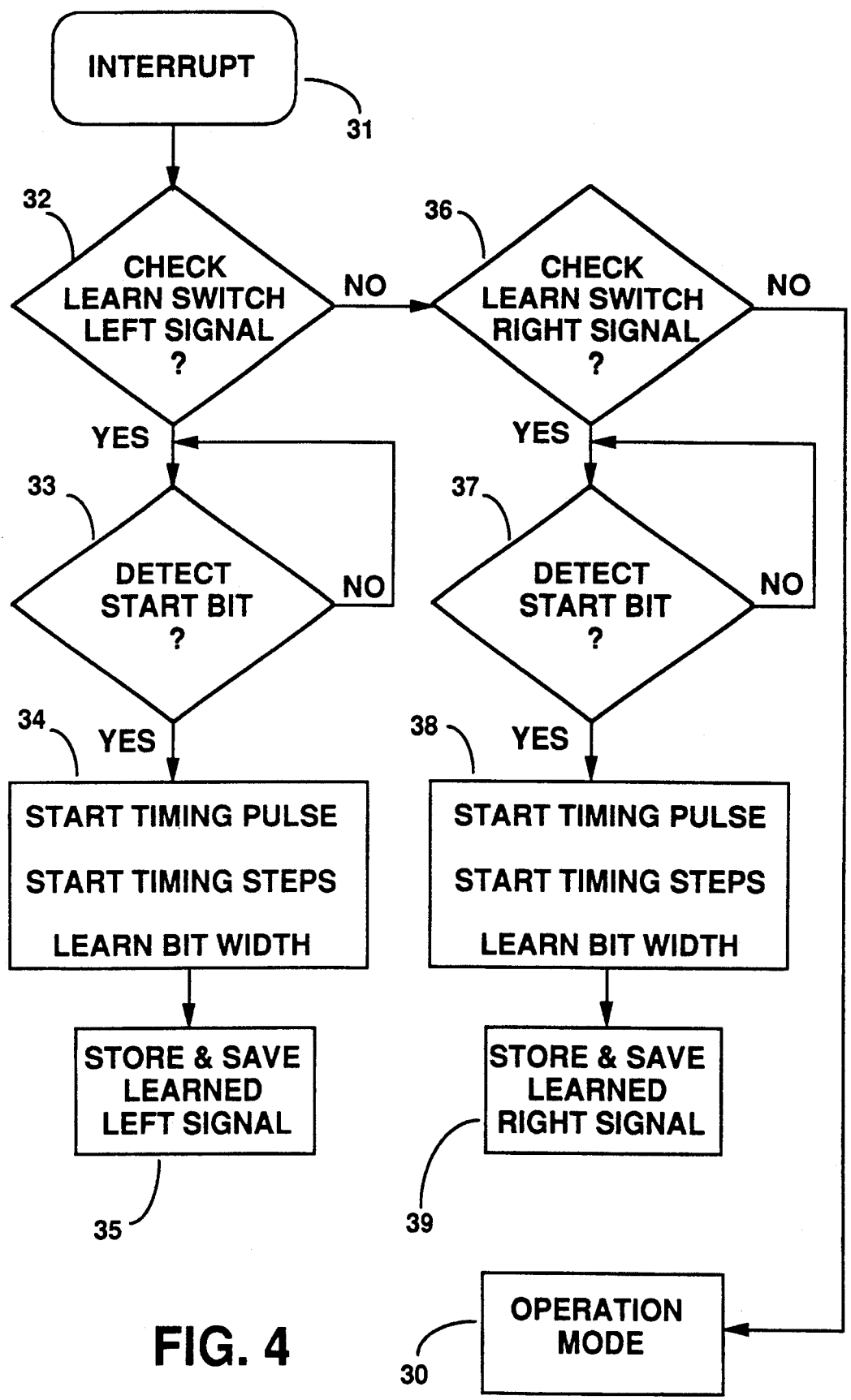
FIGS. 4 and 5 combined are a flow chart of the operations performed by the microprocessor circuitry.
Figure 5:
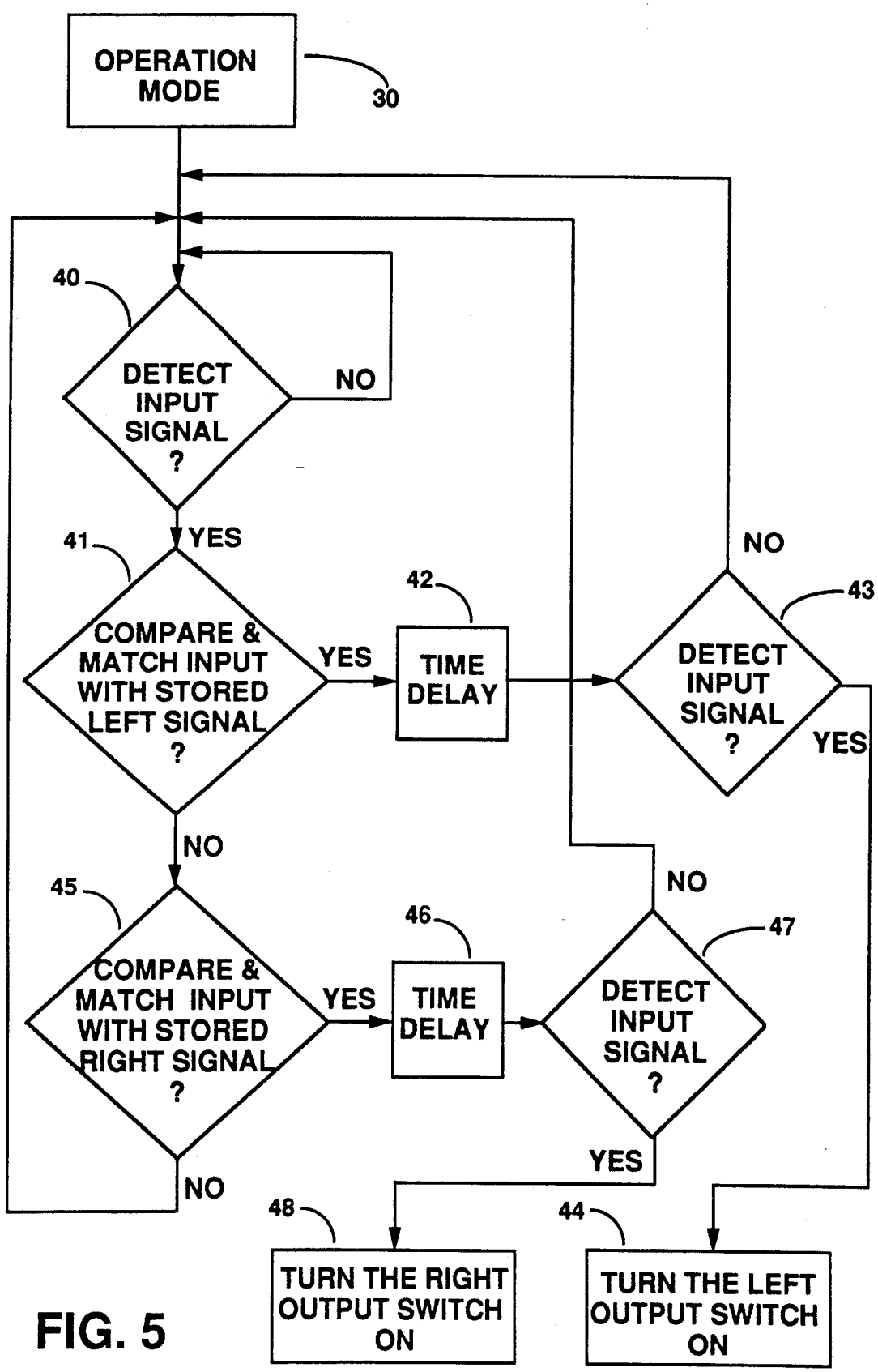

FIGS. 4 and 5 combine at block 30 to form a flow chart of various programming steps. The program advances to an interrupt routine at block 31 whenever one of the input switches 18 and 19 are actuated (the clockwise and counterclockwise learning switches) or the detector 23 detects an incoming signal. The program determines at 32 if the clockwise learning switch was actuated. If it was, the program proceeds at 33 to wait for the first infrared signal to be detected. When it is detected, the program proceeds at 34 to produce data indicative of the waveform of the first infrared signal (the first set of LEARNED DATA). Then, the program completes the interrupt routine by storing that data at 35. If the first infrared signal is not detected within a predetermined time (e.g., 400 milliseconds), the program completes the interrupt routine at 33.

If the program determines at 32 that the first input switch 18 was not actuated, it determines at 36 if the counterclockwise learning switch was actuated. If it was, the program proceeds at 37 to wait for the second infrared signal to be detected. When it is detected, the program proceeds at 38 to produce data indicative of the waveform of the second infrared signal (the second set of LEARNED DATA). Then, the program completes the interrupt routine by storing that data at 39. If the second infrared signal is not detected within a predetermined time (e.g., 400 milliseconds), the program completes the interrupt routine at 37.

If the program determines at 36 that the second input switch 19 was not actuated, it proceeds to normal operation at 30 (the WORKING MODE). In doing so, it may be said to switch to the WORKING MODE. The program proceeds from 30 to wait at 40 for an incoming infrared signal to be detected. When an incoming signal is detected, the program proceeds at 41 where it produces a set of WORKING data indicative of the waveform of the incoming signal. Next, it checks at 41 for a match with the first set of LEARNED DATA.

If the set of WORKING DATA matches the first set of LEARNED DATA, the program proceeds to delay at 42 a predetermined time (preferably less than one second) and then determines at 43 if an additional infrared signal is detected. If an additional signal is detected, the program starts over at 30 because an additional signal may indicate operator confusion or multiple pushbutton depressions intended to control a television set or other device. If an additional signal is not detected, the program proceeds at 44 to switch the first output from an OFF state to an ON state. That output is available at terminal 20C of the microprocessor U2 in FIG. 3 and it actuates the first switch 11 (the clockwise switch).

If at 41 the WORKING DATA does not match the first set of LEARNED DATA, the program checks at 45 whether it matches the second set of LEARNED DATA. If it does, the program proceeds to delay at 46 a predetermined time and then determines at 47 if an additional infrared signal is detected. If an additional signal is detected, the program starts over at 30. If an additional signal is not detected, the program proceeds at 48 to switch the second output from an OFF state to an ON state. That output is available at terminal 20D of the microprocessor U2 in FIG. 3 and it actuates the second switch 12 (the counterclockwise switch). If at 44 the WORKING DATA does not match the second set of LEARNED DATA, the program starts over at 30.

Thus, the invention provides a smart infrared controller that learns to recognize the signals produced by an infrared transmitter in use. So, the controller works with virtually any infrared remote control transmitter. In addition, the inventive concepts disclosed can be expanded for many more than one or two outputs, and the controller can be used to control almost any switchable device. The operator need only conduct a short training session to teach it the waveforms associated with various pushbuttons of the infrared transmitter in use.

Although an exemplary embodiment has been shown and described, many changes, modifications, and substitutions may be made by one having ordinary skill in the art without necessarily departing from the spirit and scope of the invention.

What is claimed is:

1. A motorized television stand, comprising:
   a rotatable television stand having means in the form of an electric motor for driving the stand in a clockwise direction and in a counterclockwise direction and means in the form of an infrared controller device for controlling the motor according to infrared signals emitted by an infrared transmitter;
   the infrared controller device including means in the form of an infrared detector for detecting infrared signals from the infrared transmitter;
   the infrared controller device including means in the form of microprocessor circuitry responsive to the infrared detector for producing first and second outputs, for switching the first output from an OFF state to an ON state if a detected infrared signal has a first predetermined waveform, and for switching the second output from an OFF state to an ON state if a detected infrared signal has a second predetermined waveform;
   the infrared controller device being connected to the motor so that the first output causes the motor to drive the rotatable stand in one of the clockwise and counterclockwise directions and the second output causes the motor to drive the rotatable stand in the other one of the clockwise and counterclockwise directions;
   the microprocessor circuitry being configured to operate in a first LEARNING MODE in which the microprocessor circuitry produces and stores a first set of LEARNED DATA indicative of the waveform of any infrared signal detected while the microprocessor circuitry is in the first LEARNING MODE;

the microprocessor circuitry being configured to operate in a second LEARNING MODE in which the microprocessor circuitry produces and stores a second set of LEARNED DATA indicative of the waveform of any infrared signal detected while the microprocessor circuitry is in the second LEARNING MODE; and the microprocessor circuitry also being configured to operate in a WORKING MODE in which the microprocessor circuitry (a) produces a set of WORKING DATA for any detected infrared signal detected while the microprocessor circuitry is in the WORKING MODE such that the WORKING DATA is indicative of the waveform of any such detected infrared signal, (b) switches the first output from an OFF state to an ON state if the set of WORKING DATA matches the first set of LEARNED DATA, and (c) switches the second output from an OFF state to an ON state if the set of WORKING DATA matches the second set of LEARNED DATA.

* * * * *